United States Patent
Lin

(10) Patent No.: US 8,224,179 B2
(45) Date of Patent: Jul. 17, 2012

(54) PORTABLE ELECTRONIC DEVICE WITH CAMERA MODULE

(75) Inventor: Tsung-Yu Lin, Taipei-Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/850,616

(22) Filed: Aug. 4, 2010

(65) Prior Publication Data

US 2011/0274422 A1 Nov. 10, 2011

(30) Foreign Application Priority Data

May 10, 2010 (TW) .............................. 99114772 A

(51) Int. Cl.
*G03B 17/02* (2006.01)
*G03B 17/48* (2006.01)
*G03B 19/00* (2006.01)
*H04N 5/225* (2006.01)
*H04N 7/00* (2011.01)
*H04N 11/00* (2006.01)
*G02F 1/16* (2006.01)
*H05K 5/00* (2006.01)
*H05K 7/00* (2006.01)

(52) U.S. Cl. ........ 396/535; 396/429; 348/376; 348/552; 361/679.23; 455/575.4

(58) Field of Classification Search ................... 396/439, 396/429, 535; 348/373, 376, 552; 361/679.23, 361/679.26, 679.27, 679.29; 455/556.1, 455/556.2, 575.1, 575.4
See application file for complete search history.

(56) References Cited

U.S. PATENT DOCUMENTS 6,406,334 B2 * 6/2002 Chu .............................. 439/668
2007/0253703 A1 * 11/2007 Tsai et al. ..................... 396/429

* cited by examiner

*Primary Examiner* — Rochelle-Ann J Blackman
(74) *Attorney, Agent, or Firm* — Altis Law Group, Inc.

(57) ABSTRACT

An exemplary portable electronic device includes a main body defining a shaft receiving hole an inner surface in the shaft receiving hole, a camera unit mounted on the main body, and a fastening member. The camera unit includes a camera module, and a shaft connected with the camera module. The shaft is rotatably received in the hole, and axially movable relative to the main body. The inner surface and the shaft cooperatively define a wedge-shaped space. The fastening member includes an elastic portion. The elastic portion is slidable between a first position where the elastic portion is engaged in a narrow end of the space, and the shaft is securely fastened to the main body by the elastic portion, and a second position where the elastic portion is disengaged from the narrower end of the space, and the shaft is unfastened from the main body.

13 Claims, 4 Drawing Sheets

PORTABLE ELECTRONIC DEVICE WITH CAMERA MODULE

BACKGROUND

1. Technical Field

The present disclosure relates to portable electronic devices, and particularly to a portable electronic device having camera module mounted therein.

2. Description of Related Art

With the ongoing development of micro-circuitry and multimedia technology, camera modules are becoming more and more popular in portable electronic devices, such as mobile phones and personal digital assistants, etc.

Camera module is typically positioned in a fixed location, for example, fixedly mounted on the back of a portable electronic device, and thus cannot be rotated without the portable electronic device itself being rotated.

Therefore, what is needed is a portable electronic device, which can overcome the above shortcomings.

DETAILED DESCRIPTION

Embodiments will now be described in detail below with reference to the drawings.

Figure 1:
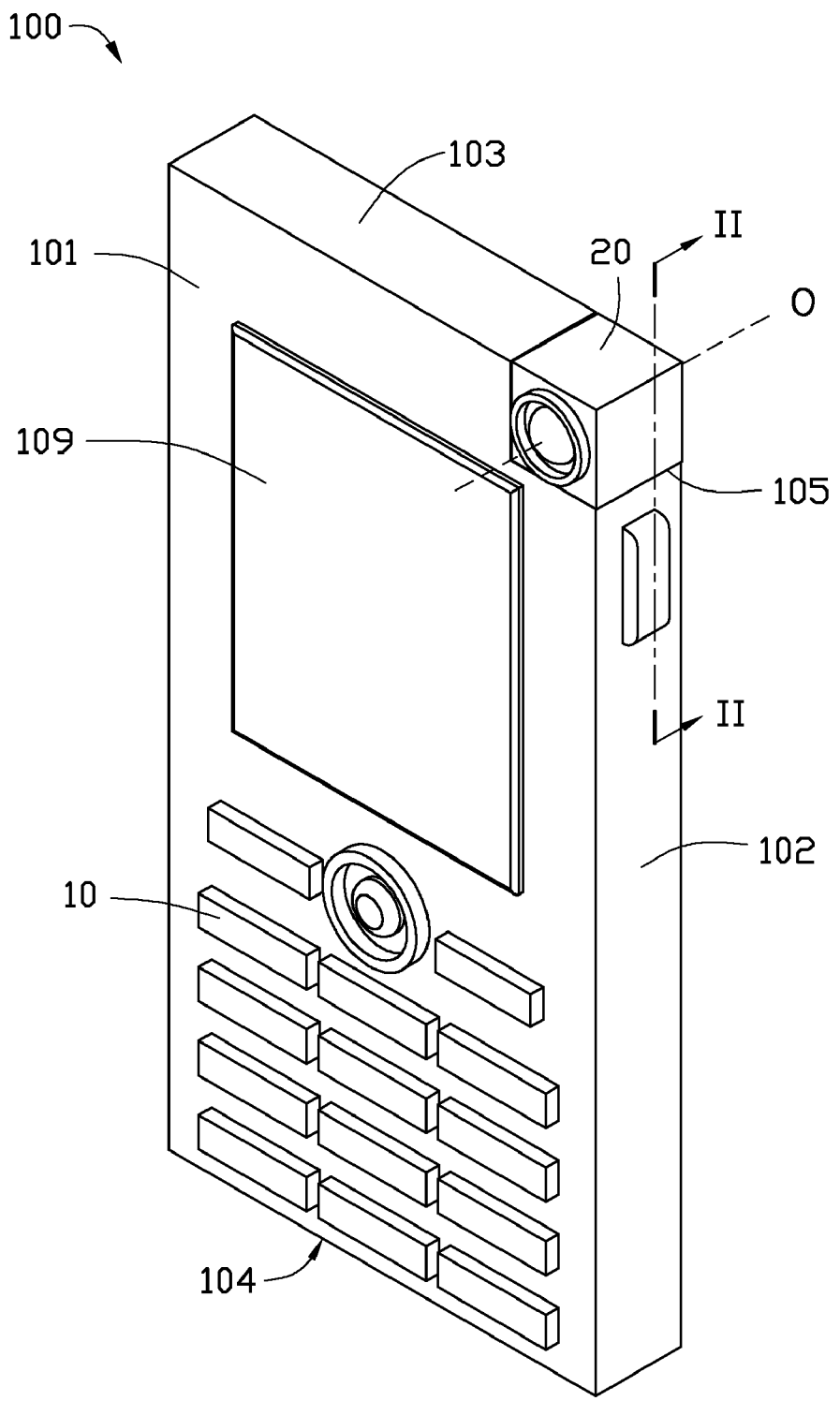
FIG. 1 is a schematic view of a portable electronic device according to an exemplary embodiment, the portable electronic device including a camera module and a main body.
Figure 2:
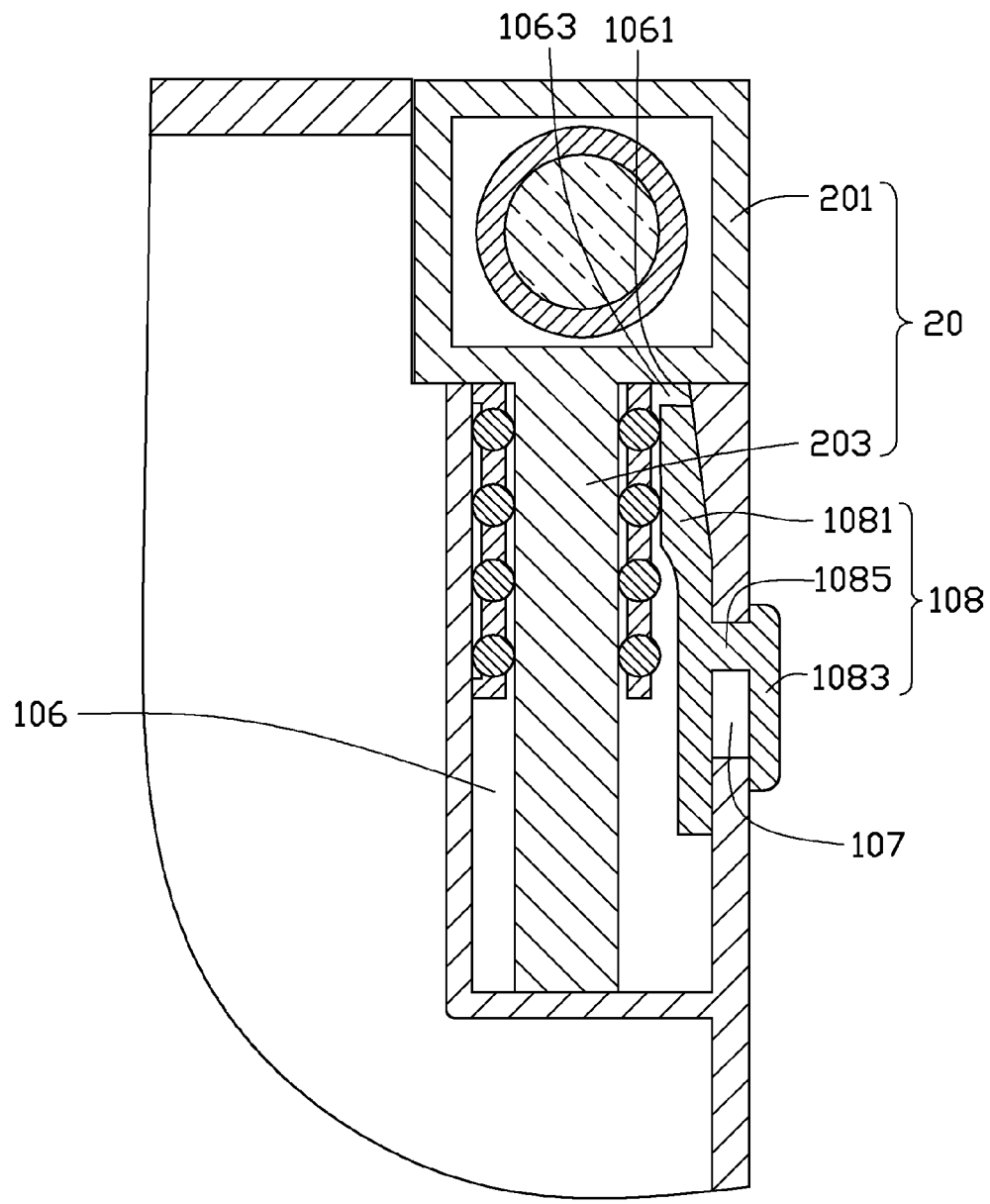
FIG. 2 is a part schematic cross-section view of the portable electronic device of FIG. 1, taken along the line II-II thereof.

Referring to FIGS. 1-2, a portable electronic device 100, in accordance with an exemplary embodiment, is shown. The portable electronic device 100 includes a main body 10, and a rotatable and retractable camera unit 20 mounted on the main body 10. The camera unit 20 includes a camera module 201, and a shaft 203 with one end thereof connected with the camera module 201. The camera module 201 has an optical axis O substantially perpendicular to a lengthwise direction of the shaft 203. In the present embodiment, the portable electronic device 100 is a mobile phone. In other embodiments, the portable electronic device 100 may instead be a note book, a personal digital assistant, etc.

The main body 10 includes a front surface 101, a side surface 102, a top surface 103, a bottom surface 104 opposite to the top surface 103, a camera module receiving opening 105 extending perpendicularly from the top surface 103 toward the bottom surface 104, a shaft receiving hole 106 extending perpendicularly from the bottom surface of the receiving opening 105 toward the bottom surface 104, a sliding slot 107 communicating with the receiving hole 106, a fastening member 108 received in the sliding slot 107, and a display screen 109 formed on the front surface 101.

The camera module receiving opening 105 is configured for receiving the camera module 201. In the present embodiment, the camera module receiving portion 105 is an L-shaped opening, and passes through the side surface 102. In other embodiments, the camera module receiving opening 105 may instead be a U-shaped opening not passing through the side surface 102, or a recess, etc.

The shaft receiving hole 106 is configured for receiving the shaft 203. A part of the inner surface 2061 of the main body 10 in the shaft receiving hole 106 is inclined relative to the central axis of the shaft receiving hole 106 so as to cooperatively define a wedge-shaped space 1063 with the shaft 203.

In the present embodiment, the sliding slot 107 is defined in the side surface 102. In other embodiments, the sliding slot 107 may instead be defined in the front surface 101, a rear surface (not labeled) opposite to the front surface 101, etc.

The fastening member 108 is movable relative to the main body 10, and includes an elastic portion 1081, a sliding portion 1083 for convenient sliding the elastic portion 1081, a connecting portion 1085 disposed between the elastic portion 1081 and the sliding portion 1083.

The elastic portion 1081 is disposed in the wedge-shaped space 1063. The elastic portion 1081 is slidable between a first position where the elastic portion 1081 is engaged in a narrow end of the wedge-shaped space 1063, and the shaft 1063 is securely fastened to the main body 10 by the elastic portion 1081 (shown in FIG. 4), and a second position where the elastic portion 1081 is disengaged from the narrower end of the wedge-shaped space 1063, and the shaft 1063 is unfastened from the main body 10 (shown in FIG. 3). In the present embodiment, the elastic portion 1081 is slidable in a direction substantially parallel to the lengthwise direction of the shaft 1063. The elastic portion 1081 can be made of material such as polyethylene terephthalate, polycarbonate, rubber, etc.

The connecting portion 1085 is received in the sliding slot 107, thereby making the elastic portion 1081 and the sliding portion 1083 disposed at opposite sides of the sliding slot 107. Actuated by the sliding portion 1083, the connecting portion 1085 can slide in the sliding slot 107, thereby making the elastic portion 1081 slide in the wedge-shaped space 1063.

In other embodiments, the fastening member 108 may omit the connecting portion 1085, and the sliding portion 1083. In such case, the elastic portion 1081 can be extended or retracted from the wedge-shaped space 1063 from the top surface 103.

The display screen 109 displays an image (not shown) formed by the camera module 201.

In the present embodiment, in order to reduce friction between the elastic portion 1081 and the shaft 203, the portable electronic device 100 also includes a fixed barrel 30 and a plurality of beads 40 rotatably embedded in a sidewall of the fixed barrel 30. Each of the beads 40 protrudes out of the fixed barrel 30 for engaging with the elastic portion 1081. In the present embodiment, the fixed barrel 30 is fixed on the top portion of the shaft receiving hole 106. In other embodiments, the fixed barrel 30 may instead be fixed on the bottom portion of the shaft receiving hole 106, or the middle portion of the shaft receiving hole 106.

The shaft 1063 is received in the fixed barrel 30 and contacts the beads 40. In the present embodiment, the shaft 1063 extends through the fixed barrel 30 and contacts the beads 40. In other embodiment, the shaft 1063 may be partially received in the fixed barrel 30.

Figure 3:
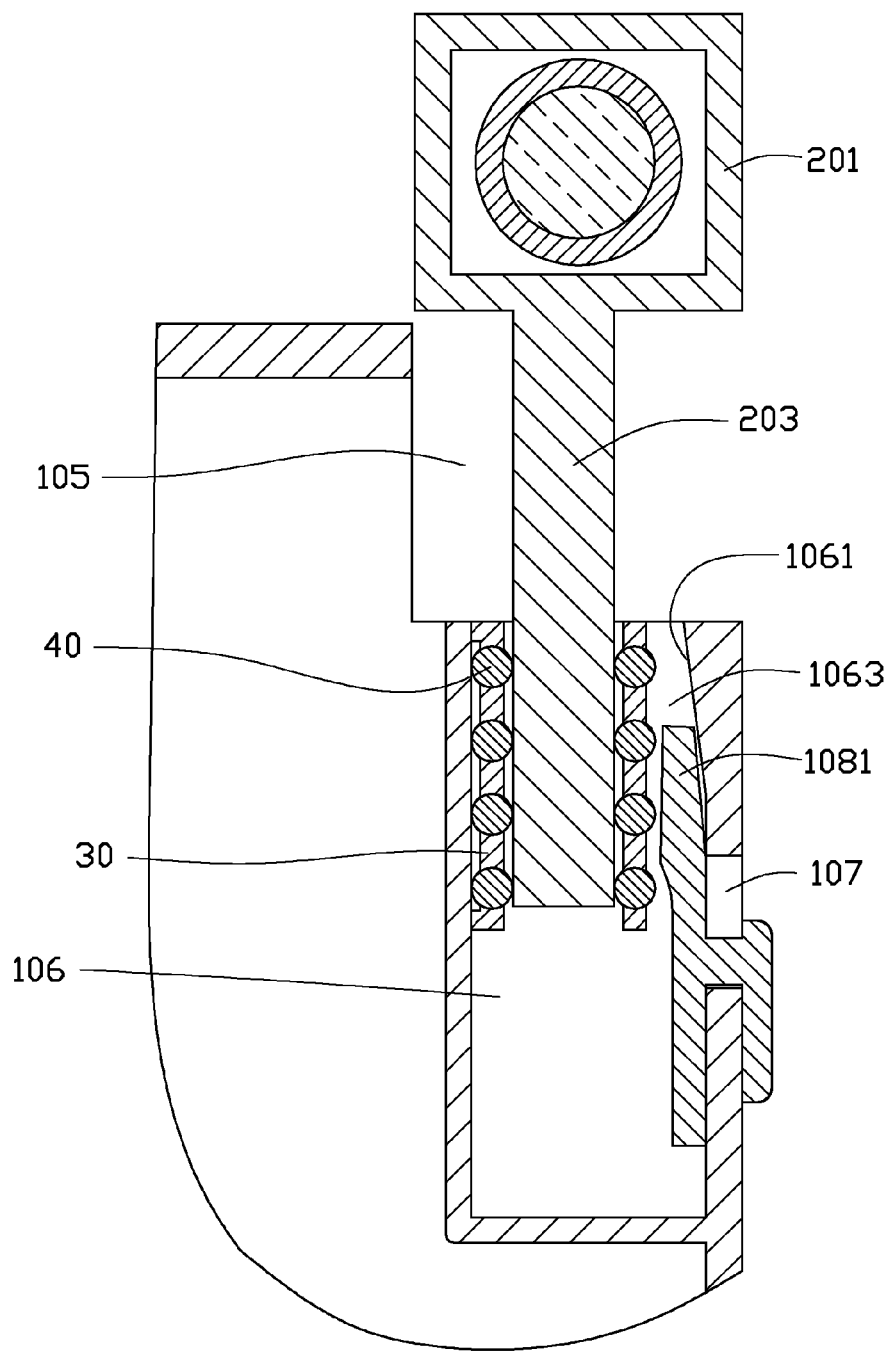
FIG. 3 is a schematic view of the camera module extended out of the main body of the portable electronic device of FIG. 1.
Figure 4:
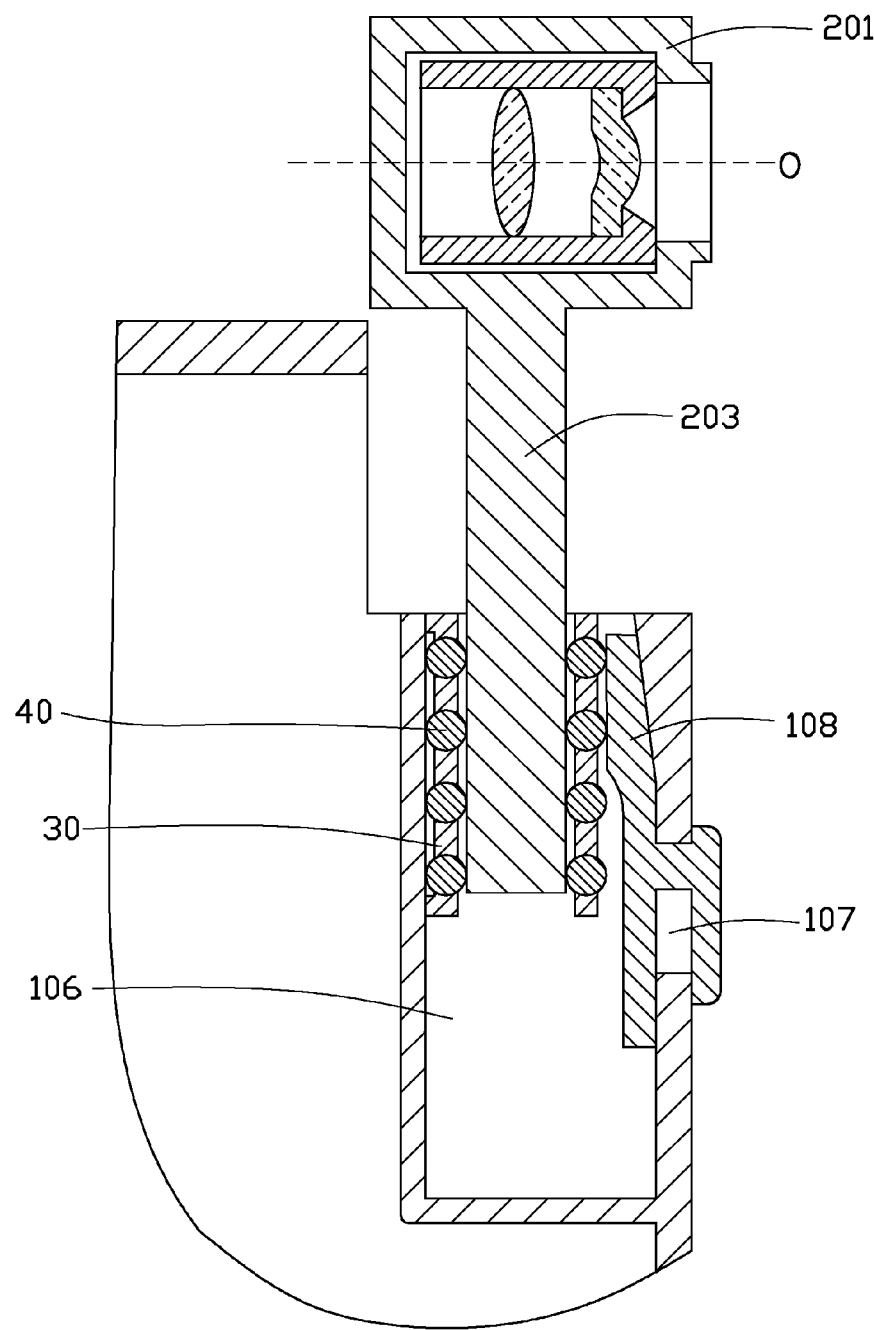
FIG. 4 is a schematic view of the camera module rotated an angle relative to the main body of the portable electronic device of FIG. 1.

Referring to FIGS. 3 and 4, the process of using the portable device 100 will be described in detail below.

First, the sliding portion 1083 is moved toward the bottom surface 104, thereby making the elastic portion 1081 reach to the second portion. In such case, the elastic portion 1081 is far away from the beads 40.

Next, the shaft 203 is partially pulled out of the shaft receiving hole 106, thereby making the camera module 201 extend from the main body 10, and the camera module 201 is rotated to a desired shooting angle (e.g. rotated ninety degrees counterclockwise).

Then, the sliding portion 1083 is pushed toward the upper surface 103, thereby making the elastic portion 1081 reach to the first position In such case, the elastic portion 1081 tightly sandwiched between the beads 40 and the inner side surface 1061 (i.e., the camera module 201 is fixed at his desired shooting angle).

Finally, after shooting an image (not shown), the sliding portion 1083 is moved toward the bottom surface 104 to make the elastic portion 2081 reach to the second position, and the shaft 203 is moved into the shaft receiving hole 106, thereby making the camera module 201 become retracted into the main body 10. Then, the sliding portion 1083 is pushed toward the top surface 103 to make the elastic portion 2081 reach to the first position, thereby fixing the shaft 203 in the shaft receiving hole 106.

The camera unit 20 can be rotated at any angle. Therefore, the requirement of multi-angle shooting is satisfied. In addition, the camera unit 20 can be extended from/retracted into the main body 10. The volume of the portable electronic device 100 thus can be reduced.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A portable electronic device comprising:
   a main body, the main body including a shaft receiving hole and an inner surface in the shaft receiving hole, the inner surface inclined relative to a central axis of the shaft receiving hole;
   a camera unit mounted on the main body, the camera unit comprising a camera module, and a shaft connected with the camera module, the shaft being rotatably received in the shaft receiving hole, and being axially movable relative to the main body, the inner surface and the shaft cooperatively defining a wedge-shaped space; and
   a fastening member comprising an elastic portion, the elastic portion being slidable between a first position where the elastic portion is engaged in a narrow end of the wedge-shaped space, and the shaft is securely fastened to the main body by the elastic portion, and a second position where the elastic portion is disengaged from the narrow end of the wedge-shaped space, and the shaft is unfastened from the main body.

2. The portable electronic device of claim 1, further comprising a camera module receiving opening for receiving the camera module and a sliding slot defined in the main body and communicating with the shaft receiving hole, the shaft receiving hole is under the camera module receiving opening, the fastening member further comprising a sliding portion, and a connecting portion disposed between the elastic portion and the sliding portion, the elastic portion and the sliding portion being disposed at opposite sides of the sliding slot, the connecting portion being movable relative to the sliding slot.

3. The portable electronic device of claim 1, wherein the camera module has an optical axis substantially perpendicular to a lengthwise direction of the shaft and the central axis of the shaft receiving hole.

4. The portable electronic device of claim 3, wherein the elastic portion is slidable in a direction substantially parallel to the lengthwise direction of the shaft.

5. The portable electronic device of claim 1, further comprising a fixed barrel fixed in the shaft receiving hole, and a plurality of beads rotatably embedded in a sidewall of the fixed barrel, the shaft extending through the fixed barrel and contacting the beads.

6. The portable electronic device of claim 5, wherein each of the beads protrudes out of the fixed barrel, the elastic portion slides in the wedge-shaped space to push the bead to latch the shaft.

7. The portable electronic device of claim 1, wherein the main body further comprises a display screen mounted thereon.

8. A portable electronic device, comprising:
   a main body defining a shaft receiving hole;
   a camera unit including a camera module and a shaft fixed to the camera module, the camera module having an optical axis substantially perpendicular to a lengthwise direction of the shaft, the shaft being received in the shaft receiving hole and movable in the lengthwise direction thereof relative to the main body, the camera module being rotatable about the shaft relative to the main body; and
   a fastening member arranged in the shaft receiving hole for fastening the shaft to the main body, the fastening member having a sliding portion exposed outside the main body and an elastic portion received in the shaft receiving hole, the sliding portion being slidable relative to the main body and driving the elastic portion to slide for fastening or unfastening the shaft.

9. The portable electronic device of claim 8, wherein the main body has an inner surface in the shaft receiving hole, the inner surface and the shaft cooperatively define a wedge-shaped space, the elastic portion is connected with the sliding portion, the elastic portion being slidable between a first position where the elastic portion is engaged in a narrow end of the wedge-shaped space, and the shaft is securely fastened to the main body by the elastic portion, and a second position where the elastic portion is disengaged from the narrow end of the wedge-shaped space, and the shaft is unfastened from the main body.

10. The portable electronic device of claim 8, further comprising a fixed barrel fixed in the shaft receiving hole, and a plurality of beads rotatably embedded in a sidewall of the fixed barrel, the shaft extending through the fixed barrel and contacting the beads.

11. The portable electronic device of claim 10, wherein each of the beads protrudes out of the fixed barrel, the elastic portion slides in the wedge-shaped space to push the bead to latch the shaft.

12. The portable electronic device of claim 9, wherein the elastic portion is slidable in a direction substantially parallel to the lengthwise direction of the shaft.

13. The portable electronic device of claim 8, further comprising a sliding slot defined in the main body and communicating with the shaft receiving hole, the fastening member further comprising a connecting portion disposed between the elastic portion and the sliding portion, the elastic portion and the sliding portion being disposed at opposite sides of the sliding slot, the connecting portion being movable relative to the sliding slot.

* * * * *